United States Patent
Constable

[15] 3,678,341
[45] July 18, 1972

[54] SURGE VOLTAGE PROTECTION SYSTEM

[72] Inventor: James M. Constable, Flushing, N.Y.
[73] Assignee: Del Electronics Corp., Mount Vernon, N.Y.
[22] Filed: Aug. 5, 1970
[21] Appl. No.: 61,379

[52] U.S. Cl. ................................317/61.5, 307/93, 336/175
[51] Int. Cl. ..........................................................H02h 1/04
[58] Field of Search..............317/61.5, 50; 307/93; 336/175; 333/79, 33; 323/89 C, 89 R

[56] References Cited

UNITED STATES PATENTS

| | | | |
|---|---|---|---|
| 1,664,494 | 3/1928 | Smith | 317/61.5 |
| 3,066,260 | 11/1962 | Scoles | 317/61.5 |
| 3,025,480 | 3/1962 | Guanella | 333/24 G X |
| 2,973,490 | 2/1961 | Schlicke | 336/175 X |
| 3,473,091 | 10/1969 | Morris | 317/18 |
| 3,200,355 | 8/1965 | Dahlen | 333/79 |
| 1,792,375 | 2/1931 | Jakosky | 336/175 X |

*Primary Examiner*—J. D. Miller
*Assistant Examiner*—Harvey Fendelman
*Attorney*—James and Franklin

[57] ABSTRACT

Protection against surge voltages, particularly in high power applications such as electron welding systems, is provided by causing a pair of electrical conductors carrying current in opposite directions to pass through a toroid of high magnetic permeability, that toroid producing a high inductance in those lines without saturating, that inductance acting in conjunction with protective capacitors connected across the lines so as to minimize the surge voltages produced by short circuits or other abnormalities in the overall system.

3 Claims, 4 Drawing Figures

INVENTOR.
JAMES M. CONSTABLE
BY James and Franklin
ATTORNEY

PATENTED JUL 18 1972 3,678,341

INVENTOR.
JAMES M. CONSTABLE
BY James and Franklin
ATTORNEY

SURGE VOLTAGE PROTECTION SYSTEM

The present invention relates to a system for reducing the deleterious effects of surge voltages, particularly in high power applications such as electron welding systems.

There are many occasions where power supplies must be protected against abnormal occurrences in the systems which they are energizing. Quite frequently such abnormal occurrences involve the production of extremely large voltage surges in the conductive lines, and when those voltage surges reach the power supply, they can damage or destroy circuit elements of those power supplies. This is particularly true when the power supplies include rectifiers. Those rectifiers will normally function reliably and well over a given voltage range, but if an excessive voltage is applied thereto, particularly a reverse voltage, destructive breakdown occurs, and the rectifiers are thereafter rendered useless.

The present invention, designed to prevent or minimize the effect of such voltage surges on power supplies or other circuit subassemblies, will be here specifically disclosed in connection with a power supply, and particularly a filament power supply, for a beam or electron welding system. This particular application has been chosen to exemplify the instant invention because in its operation the problems which this system is designed to eliminate frequently arise, and in a particularly aggravated form because of the high voltages (typically in the range of 60–200 kv) and the high amounts of power (typically in the range of 5–50 kilowatts) which are involved. In such a system the beam welding gun comprises a filament and a control grid. An electron beam comes from the filament and is directed to a workpiece where welding is to be effected. The workpiece is grounded and the filament is placed at a high voltage relative thereto, thereby to produce the welding beam of electrons, and that beam is controlled by the bias voltage applied to the grid. Several power supplies are required in connection with the use of such an electron welding gun. One power supply must provide the high voltage relative to ground which is applied to the filament. Another power supply must provide a rather large current to the filament, in order to give it enough power to produce the electron beam needed for welding. A third power supply is required in order to provide the voltage which is applied to the control grid of the electron gun. These power supplies are generally located at a station somewhat remote from the point where the electron gun is being used, and they are connected to the gun by means of a high voltage cable. Since external power is generally available only in AC form, and since DC power is required to operate the electron gun, these power supplies necessarily involve the use of rectifiers, and usually full wave rectification is essential.

It frequently occurs, particularly when the electron gun is first put into use for a given operation, that sparks occur between the filament or grid and ground. These sparks represent a short circuit condition. The transmission line which connects the gun to its power supplies represents essentially an open circuit at its power supply end, since that end of the cable does not have a resistance to ground even remotely as great as the resistance to ground at the gun end of the cable. As a result, when sparkovers or short circuits occur at the gun, voltages that are many times as great as the original power supply voltage can be developed, in the form of high frequency spikes or surges, at the power supply end of the high voltage cable. Those power supplies which provide primarily only voltage (those which provide the biases for the filament and the grid) can be protected against these voltage sparks or surges by relatively conventional means. However that power supply which must provide appreciable amounts of current, to wit, the one which provides the current or power for the filament itself, cannot be protected as readily, and it is there that constant problems have arisen. One attempt to ameliorate the problem presented in such filament power supplies has involved connecting low inductance capacitors across the lines in an attempt to absorb the energy of the voltage sparks or surges at a low enough voltage level so that the reverse rating of the rectifiers used would not be exceeded. This has been done with moderate success, but it has not functioned in a reliable fashion. The capacitors were able to protect the circuits against some voltage surges but not against all of them, and consequently failure of rectifiers in these power supplies has continued to be a serious problem. As a result it has proved necessary in power supplies subjected to these voltage surges to use selenium rectifiers rather than silicon rectifiers, because the selenium rectifiers are less susceptible to breakdown when subjected to excessive reverse voltage. It is to be emphasized that even selenium rectifiers are not completely immune to reverse transient breakdown; they are only more resistant than silicon rectifiers in that connection. Selenium rectifiers are in general undesirable because they are large in size and inefficient in operation, but this drawback in the past has been accepted because the use of silicon rectifiers was out of the question—the protective capacitors simply could not provide sufficient protection to permit silicon rectifiers to be used.

It is the prime object of the present invention to devise a system for significantly reducing the adverse affect of voltage surges on power supplies involving rectification.

A further object of the present invention is to provide a system for protection against voltage surges which will permit the use of silicon rectifiers rather than selenium rectifiers.

Yet another object of the present invention is to provide a system for protection against surge voltages which is simple, inexpensive, reliable, and effective.

To these ends there is provided in the power transmission system means for increasing the inductance of the lines sufficiently so that, at the high frequencies represented by the voltage surges, the effect of the surges is reduced to a state such that the existing protective capacitors can absorb the energy thereof. As a result that energy is prevented from being applied to and destroying or damaging the rectifiers. This increase in inductance must be accomplished in such a fashion that it will be effective on the voltage surges, which are unsymmetric in nature, despite the fact that substantial power currents which are symmetric in nature, are being carried by the lines subjected to the voltage surges. Accordingly, in accordance with the present invention the two or more lines which carry current in opposite directions and which are subjected to the deleterious effects of voltage surges are operatively electromagnetically associated with a toroid of high magnetic permeability. In the most simple form the lines in question are passed through that toroid, thus in effect constituting a single turn winding. They may, if desired, be wound about the toroid, thereby to constitute a multiple turn winding. In either event their electromagnetic association with the toroid greatly increases the inductance of the line. The fact that two or more wires which carry load currents passing in opposite directions are thus simultaneously associated with the toroid ensures surge currents the toroid will not become saturated no matter what the value of the load current carried by the lines, and as a result the inductance-increasing effect of the toroid on unsymmetric surgecurrents will be realized under all load current conditions. When the inductance added to the lines by the toroid is appreciably greater than the inductance of the protective capacitors, the toroid-produced inductance and the capacitor inductance will so cooperate as to greatly reduce the voltage developed across the capacitors and hence applied to the rectifiers connected to the lines, thus effectively protecting those rectifiers. The toroids can be utilized at various points in the circuit, both close to and remote from the actual rectifiers.

To the accomplishment of the above, and to such other objects as may hereinafter appear, the present invention relates to a system for ameliorating the effect of surge voltages in electrical circuits provided with rectifiers, as defined in the appended claims and as described in this specification, taken together with the accompanying drawings, in which:

Figure 1:
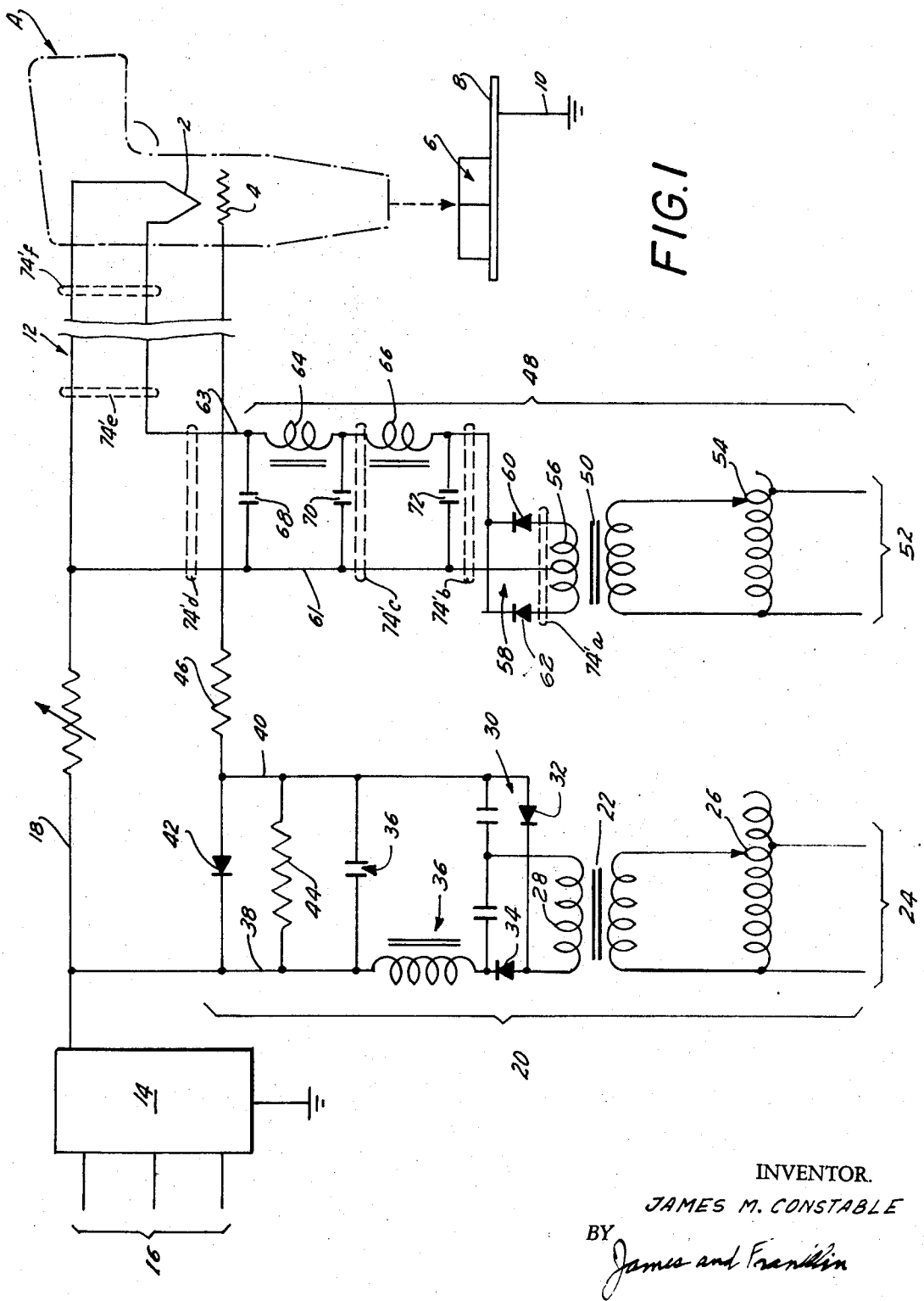
FIG. 1 is a schematic and circuit diagrammatic view of the present invention as embodied in an electron beam welding system.

As has been set forth above, the present invention will be here specifically illustrated as embodied in a system for controlling and energizing an electron beam welding machine. This is done solely for purposes of exemplification and not for purposes of limitation. Such a system is disclosed in FIG. 1. The electron gun generally designated A and enclosed by dot-dash lines comprises a filament 2 which represents the source of the electron beam and a control grid 4 which controls that beam. The gun is positioned close to a workpiece generally designated 6 mounted on any appropriate support 8 and grounded as indicated at 10. Relative movement is effected between gun and workpiece as required by the particular welding task involved. The electron gun A is connected by means of a high voltage cable, generally designated 12, to the power supplies therefor, which may be located either at a remote point or at a point relatively close to the place where the welding operations take place. One part of that power supply is constituted by a high voltage source 14 fed by a suitable external source of power such as the three-phase source generally designated 16. The output of the high voltage power supply is fed along lead 18 to the filament 2, thus biasing that filament relative to ground at some appropriate voltage, usually in the range of 60 to 200 kilovolts.

The power supply generating the voltage for the control grid 4 is generally designated 20. It comprises a transformer 22 fed from an external line source 24 via an adjustable autotransformer 26, the secondary winding 28 of the transformer 22 being connected to a full-wave doubler 30 comprising the rectifier elements 32 and 34. The output of that doubler 30 is fed to a filter circuit 36 and then, via leads 38 and 40, to the line 18 (connected to the filament 2) and to the control grid 4 respectively, thereby producing a bias on the control grid 4 relative to the filament 2. A rectifier 42 and a resistor 44 may be connected between the lines 38 and 40, and a resistor 46 may be connected between the line 40 and the control grid 4. The specific nature of the power supply 20 for the control grid 4 as here disclosed forms no part of the present invention, may be widely varied, and therefore must be considered only as exemplary.

The power supply which provides the current or power to the filament 2 is generally designated 48. It comprises a transformer 50 connected to an external power source 52 by means of an adjustable autotransformer 54, and its secondary winding 56 is connected to a full wave rectifier circuit 58 which includes the rectifier elements 60 and 62. The output from that full-wave rectifier is fed along lines 61 and 63 to opposite ends of the filament 2. Chokes 64 and 66 are included in the line 61 63, and capacitors 68, 70 and 72 are connected between the lines 61 and 63, those capacitors functioning with the chokes 64, 66 to produce a filtering effect, and those capacitors also functioning in some degree to provide voltage surge protection, as described above.

The specific nature of the circuit details for the power supply 48 form no part of the present invention, as thus far described. They may be widely varied, and many different types of rectifiers, rectifying circuits, filter circuits, and electrical connections to different types of external power sources may be utilized, all as is well known to those versed in this art.

The power supplies 14 and 20 essentially produce voltage, and need not carry any significant amounts of current. Accordingly protection of those power supplies against voltage surges or spikes which may move from the electron gun A back along the cable 12 presents no particular problems. However, protecting the rectifiers 60 and 62 of the power supply 48 from such voltage surges is another matter entirely. As set forth above, the capacitors 68, 70 and 72, while affording some protection, were far from satisfactory in that regard, and therefore, despite the fact that such protective capacitors were used, selenium rather than silicon rectifiers still had to be employed in prior art circuits, despite their obvious and well known disadvantages, because the otherwise preferable silicon rectifiers were too susceptible to reverse voltage breakdown.

Analysis has suggested that the reason why the capacitors 68, 70 and 72 did not provide adequate protection against these voltage surges or spikes was because of the very rapid rise of voltage involved in such surges or spikes, this in effect producing a voltage change of very high frequency. This, acting in conjunction with the inherent inductance of those capacitors, limited the protective effect of the capacitors. Even a good 1 mfd low inductance capacitor can have an inductance of 0.07 microhenries. A 100 mHz frequency represents a conservative estimate of the effective frequency involved in the voltage surges or spikes of the type under discussion. At such frequencies the actual inductance of the capacitors would be on the order of 60 ohms. At this impedance level a current of only 3.5 amperes would be sufficient to develop across that capacitor voltage sufficient to break down a 200 volt rectifier being used for a 10 volt filament supply. The currents actually involved in filament supply will normally be much greater than 3.5 amps.

With this consideration in mind, means are provided to increase the inductance of the conductive lines of the filament power supply circuit to a degree large compared to the inherent inductance of the protective capacitors. This has the effect of reducing the voltage drop across the inherent inductance of those capacitors to a value that the rectifiers can withstand.

Figure 2:
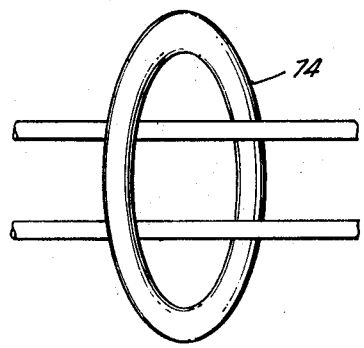
FIG. 2 is a perspective view showing a pair of conductors passing through a toroid of high magnetic permeability.

To accomplish this increase in line inductance, to cooperate with the across-the-line inductance of the protective capacitors 68, 70 and 72, I utilize a toroid of high magnetic permeability, such as is illustrated in FIG. 2 and to which the reference numeral 74 is applied. Such a toroid 74 is indicated schematically in broken lines at various places in the circuitry of the power supply 48, those locations and toroids being represented by the reference numeral 74'. A plurality of such toroid locations 74' are indicated on FIG. 1. In general it is contemplated that only a single toroid 74 need be employed in one only of the locations 74' indicated in FIG. 1, but where necessary additional such toroids 74 could be employed. The specific locations 74' shown in FIG. 1 are not exhaustive but are only exemplary. What is required is that the toroid 74 be operatively electromagnetically associated with a pair of leads or conductors through which current flows in opposite directions, preferably in substantially equal amounts. That pair of conductors may be the two output lines from the transformer secondary 56, as indicated at the location 74'a, it may be the two output lines from the rectifier elements 60 and 62, as indicated by the location 74'b, it may be the two lines within the filter circuitry, as indicated by the location 74'c, it may be the output lines 61 and 63 from the filter circuit, as indicated by the location 74'd, it may be the leads in the high voltage cable at the end thereof remote from the gun, as indicated by the location 74'e, it may be located at the end of the high voltage cable 12 adjacent the gun A, as indicated by the location 74'f, it may be located someplace along the length of the cable 12, or it may be some other position or location, provided that a pair of lines (or more than two lines in the event that the system is thus constituted) which carry current flowing in opposite directions are operatively associated therewith. The reason for this requirement is that it is the magnetic permeability of the toroid 74 which produces the desired increase in line inductance. The toroid will produce that increase in inductance only so long as it is not magnetically saturated. If it were to encompass only a single conductor, and if that conductor were to carry a significant amount of current (as would be the case if it were designed to provide current to the filament 2 of an electron beam gun) that current would have the effect of wholly or partially saturating the toroid 74, thus essentially destroying its inductance-producing function.

However, when the toroid 74 is operatively associated with a plurality of conductors under circumstances in which the current flowing through those conductors, at any given instant, essentially or appreciably cancel one another out insofar as affecting the magnetic saturation of the toroid 74 is concerned, then that toroid will continue to have its desired inductance-increasing effect even though the conductors associated therewith may be carrying substantial amounts of current.

By placing an inductance, large compared to the inherent inductance of the protective capacitors, in the leads which go to the parallel connection of protective capacitors 68, 70, 72 and rectifiers-to-be protected 60, 62, the voltage drop across the capacitors 68, 70, 72 will be reduced by the ratio of their inherent inductance to the series inductance added by the toroid 74. Thus the transient voltage across the protective capacitors, which voltage is therefore applied across the rectifiers to be protected, will be reduced by that factor.

It is usually sufficient, as shown in FIG. 2, merely to have the conductors pass through the toroid 74, thus in effect constituting a one-turn winding, but if insufficient inductance is added to a given circuit in that fashion, it is entirely feasible to wind the conductors around the toroid one or more times, thereby producing a multi-turn winding the effective inductance of which will be correspondingly increased when compared to the single-turn winding.

The toroids can be formed of any suitable high magnetic permeability material. The higher the magnetic permeability the better, in general, since the amount of inductance added to the circuit is related to the magnetic permeability of the toroid material. Ferrite materials are quite satisfactory. Specifically, toroids made of Ferrocube 846 T250–3E2A and of Indiana General CF114–11 material have proven quite satisfactory. Passing a pair of wires through toroids of appropriate size made with such materials provides an inductance of 3 microhenries through the Ferrocube material and approximately 1 microhenry through the Indiana General material. These values of inductance, it will be noted, are many times greater than the inherent inductance, on the order of 0.07 microhenries, of the protective capacitors 68, 70 and 72 used therewith.

An added advantage of passing the two wires of the power supply output through the toroid 74 is that this arrangement tends to equalize the voltage surges or transients on both of those leads, thus further ensuring that excessive reverse voltages are not applied across the rectifiers to be protected.

Figure 3:
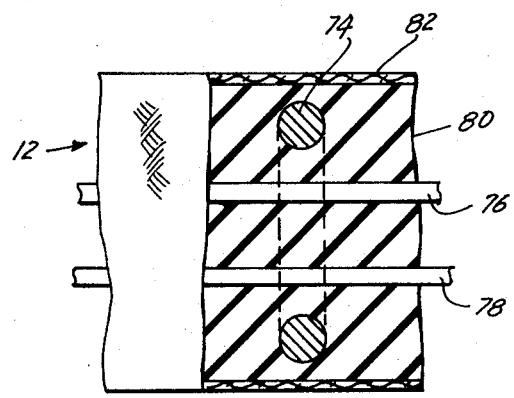
FIG. 3 is a fragmentary side elevational view, partially broken away, showing one way in which the high magnetic permeability toroid can be utilized directly in conjunction with a high voltage cable.
Figure 4:
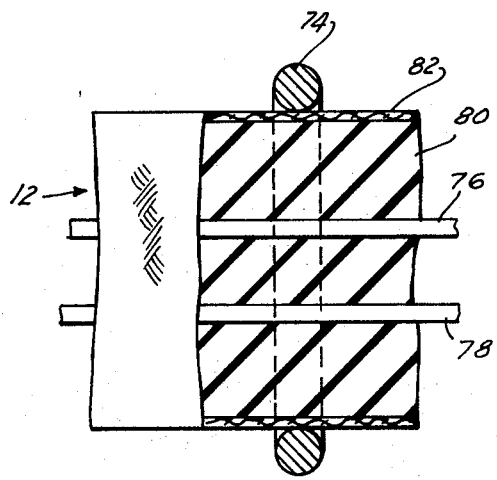
FIG. 4 is a view similar to FIG. 3 but showing another specific manner in which the toroid can be utilized in conjunction with a high voltage cable.

The high voltage cable 12, as shown in FIGS. 3 and 4 generally comprises the electrical conductors 76 and 78 spaced from one another and surrounded by an insulating mass or body 80 which is in turn surrounded by a conductive protective braid or shield 82. When the toroid 74 is to be directly physically associated with the cable 12, one way in which it may be used is, as illustrated in FIG. 3, to place it inside the braid 82 but still around both of the conductors 76 and 78, the toroid 74 thus being embedded in the insulating material 80. Alternatively, and as shown in FIG. 4, the toroid 74 may be applied outside the braid 82. The embodiment of FIG. 3 is preferable in some respects, because less of the expensive toroid material need be employed and because there are no protrusions on the cable 12. The embodiment of FIG. 4 is preferable when existing cable 12 is to be modified or adapted for use in conjunction with the present invention.

The use of the toroid 74 directly in conjunction with the high voltage cable 12 permits such toroids to be located close to that end of the cable 12 to which the electron gun A itself is connected. This has the added effect that the rate at which the surge-producing short circuit occurs is limited, thus limiting the effective frequency of the transient to a value that can more readily be handled by the protective capacitor. In such an instance the toroid 74 would also, by adding inductance to the circuit, assist the capacitors in handling that transient in the manner set forth above.

It will be apparent that the means employed to provide protection against voltage surges is simple, structurally strong, and reliable in operation. It has been found that through the use of this invention electron beam welding systems involving voltages in the hundreds of kilovolts and filament currents which frequently reach 50–100 amperes can reliably function without breakdown even when silicon rectifiers are employed, whereas before the system of the instant invention was utilized selenium had to be employed in such systems in order to make them practical at all, and even then breakdown because voltage surges was an all too frequent problem.

While but a limited number of specific embodiments of the present invention have been here specifically disclosed, and while that invention has been here specifically disclosed only in conjunction with a beam welding system, it will be apparent from the above that this is purely by way of exemplification and not by way of limitation, and that many variations may be made in the circuitry and systems, all without departing from the spirit of the invention as defined in the following claims.

I claim:

1. An electron beam welding machine comprising a welding gun comprising an electrode, a DC power supply therefor, a cable connecting said power supply and said filament and comprising a pair of leads through which current flows in opposite directions, and a toroid of high magnetic permeability operatively surrounding said leads in said cable, in which said cable comprises said lines enclosed within a sheath, said toroid being located between said sheath and said lines.

2. A high power DC electrical system comprising a work element, a power supply including rectifier means, a pair of electrical lines through which current flows in opposite directions connecting said power supply and said work element, a capacitor connected across said lines, and a toroid of high magnetic permeability operatively surrounding said pair of lines, in which said lines comprise a power transmission cable with said work element at one end thereof, said capacitor being connected across said lines between said power supply and said cable, said toroid being located adjacent the other end of said cable, in which said cable comprises said lines enclosed within a sheath, said toroid being located between said sheath and said lines.

\* \* \* \* \*